United States Patent [19]

Hanzawa et al.

[11] Patent Number: 5,331,457
[45] Date of Patent: Jul. 19, 1994

[54] STEREOMICROSCOPE WHEREIN THE DISTANCE BETWEEN A PAIR OF BEAMS REMAINS UNCHANGED WHEN THE MAGNIFICATION IS CHANGED

[75] Inventors: Toyoharu Hanzawa, Fuchu; Kimihiko Nishioka, Hachiouji; Yoshihiro Kawano, Hachiouji; Masaaki Yamagishi, Hachiouji, all of Japan

[73] Assignee: Olympus Optical Co., Ltd., Tokyo, Japan

[21] Appl. No.: 30,552

[22] Filed: Mar. 12, 1993

Related U.S. Application Data

[62] Division of Ser. No. 729,346, Jul. 12, 1991, Pat. No. 5,227,914.

[30] Foreign Application Priority Data

Jul. 18, 1990 [JP] Japan ................ 2-190069
Oct. 19, 1990 [JP] Japan ................ 2-280905

[51] Int. Cl.⁵ ................................ G02B 21/22
[52] U.S. Cl. ................................ 359/377; 359/380
[58] Field of Search ............... 359/377, 380, 376

[56] References Cited

U.S. PATENT DOCUMENTS

| | | |
|---|---|---|
| 4,072,395 | 2/1978 | Mohon . |
| 4,341,435 | 7/1982 | Lange et al. . |
| 4,436,384 | 3/1984 | Taira . |
| 4,674,845 | 6/1987 | Matsumura ............... 359/377 |
| 4,688,907 | 8/1987 | Kleinberg . |
| 4,783,159 | 11/1988 | Takagi et al. . |
| 4,802,749 | 2/1989 | Togino et al. . |
| 4,824,228 | 4/1989 | Wickholm et al. . |
| 4,838,671 | 6/1989 | Papritz et al. . |
| 4,991,947 | 2/1991 | Sander et al. . |
| 5,015,081 | 5/1991 | Kitajima et al. . |
| 5,052,789 | 10/1991 | Kleinberg . |

FOREIGN PATENT DOCUMENTS

| | | |
|---|---|---|
| 0204047 | 4/1962 | Fed. Rep. of Germany . |
| 3602095 | 7/1986 | Fed. Rep. of Germany . |
| 3212691 | 10/1983 | France ................ 359/376 |
| 56-144410 | 11/1981 | Japan . |
| 56-165114 | 12/1981 | Japan . |
| 60-001110 | 1/1985 | Japan . |
| 61-061116 | 3/1986 | Japan . |
| 61-061118 | 3/1986 | Japan . |
| 61-172111 | 8/1986 | Japan . |
| 928205 | 6/1963 | United Kingdom ........ 359/377 |

*Primary Examiner*—Jon W. Henry
*Attorney, Agent, or Firm*—Cushman, Darby & Cushman

[57] ABSTRACT

A stereomicroscope is equipped with an objective lens, a variable magnification optical system having an optical axis common with that of the objective lens, a splitting optical system splitting emergent light from the variable magnification optical system into a plurality of optical paths, and an eyepiece disposed in at least one of the optical paths, having a diameter larger than the interpupil distance of an observer. Thus, the stereomicroscope has advantages that, with a simple structure and easy adjustment, many people can make observations, the mountings of photographic and TV devices are possible, the directions in which plural observers see through the microscope can be changed, and eyestrain is difficult to occur which may be caused by the difference in magnification between the images of a bilateral observation optical system.

7 Claims, 10 Drawing Sheets

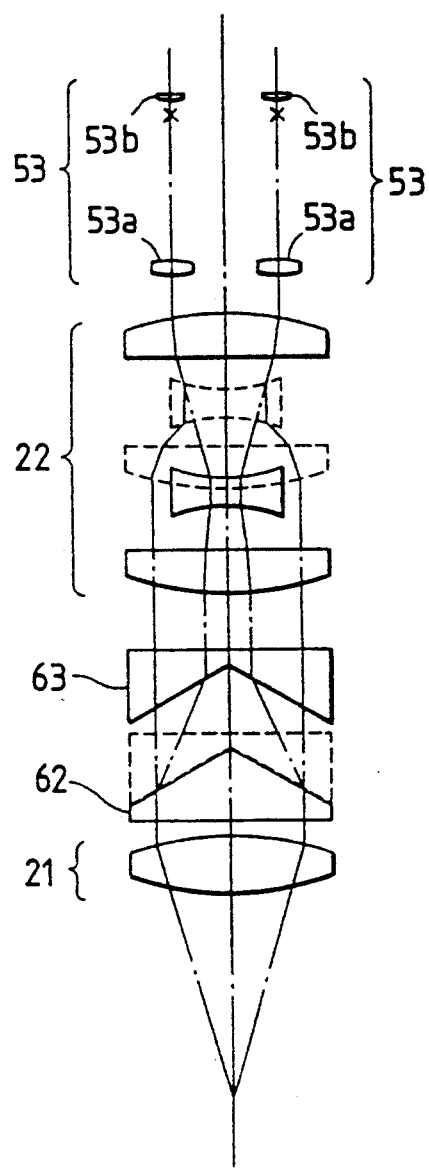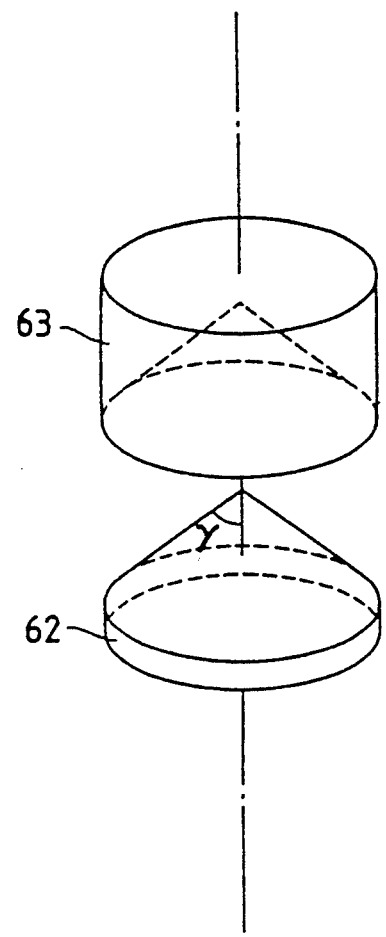
FIG. 19
FIG. 20

STEREOMICROSCOPE WHEREIN THE DISTANCE BETWEEN A PAIR OF BEAMS REMAINS UNCHANGED WHEN THE MAGNIFICATION IS CHANGED

This is a division of application No. 07/729,346, filed Jul. 12, 1991, now U.S. Pat. No. 5,227,914.

BACKGROUND OF THE INVENTION a) Field of the Invention

This invention relates to a stereomicroscope variable in magnification in which many units are arbitrarily mounted and a plurality of observers can make observations at any angle.

b) Description of the Prior Art

In recent years, precision work in small areas, such as fine working and operations, has come to be largely done. Hence, stereomicroscopes through which fine areas can be viewed and three-dimensional positions are secured, are provided as its effective means. Additionally, since cases has been increasing where plural observers must operate at the same time due to the precision work, it is desired that they can observe images with substantially the same magnification and stereoscopic visibility. There is also the improved demand for the attachments of apparatus using variable magnification optical systems, such as photographic devices, TV cameras, and laser devices, to the stereomicroscopes.

The conventional stereomicroscopes each have usually two or more variable magnification optical systems which are the same as one another. Hence, to enable plural observers to make observations, some of the stereomicroscopes are such that, as set forth in Japanese Utility Model Preliminary Publication No. Sho 60-1110 by way of example (FIGS. 1 and 2), optical paths arranged in a pair are each split into two so that the observers face to each other for observation. FIG. 1 is a side view showing the entire optical system of this prior art and FIG. 2 is a perspective view of its essential part, in which reference numeral 1 represents an objective lens used common to the optical paths of a bilateral optical system, 2 variable magnification optical systems, 3 beam splitters, 4 reflecting prisms, 5 optical path deflecting prisms, 6 imaging lens, 7 Porro prisms, and 8 eyepieces.

Further, some of the stereomicroscopes are such that, for example, as set forth in Japanese Patent Preliminary Publication No. Sho 56-144410 (FIGS. 3 and 4), the pair to the optical path is split and a pupil is divided at a position of the pupil relayed for a stereoscopic view. FIG. 3 is a front view showing the entire optical system of this prior art and FIG. 4 is a plan view of its pupil dividing section. In these figures, reference symbol P denotes a glass block for adjusting the optical path lengths of the bilateral optical system, numerals 9 and 9' relay lenses, 10 an image rotator, and 11 a pupil dividing mirror, in which like reference numerals indicate the members having like functions with those shown in FIGS. 1 and 2.

Others of the stereomicroscopes are such that, for example, as stated in Japanese Patent Preliminary Publication No. Sho 61-172111 (FIGS. 5 and 6), three or more variable magnification optical systems are incorporated therein. FIG. 5 is a front view showing the entire optical system of one embodiment of this prior art and FIG. 6 is a plan view of the essential part thereof, in which reference numeral 12 and 12' denote imaging optical systems including imaging lenses and 13 a mirror.

In any of the prior art mentioned above, however, the split of optical paths for the stereoscopic view, that is, for making separate beams of light incident on the eyes of each observer, is performed by providing the variable magnification optical systems in a pair directly behind a common objective lens, so that the arrangement of a microscopic optical system is complicated. Such an optical system has encountered the problems that, in order to enable a number of people to make observations and photographic and TV devices to be mounted, other prisms and variable magnification optical systems are inevitably added and consequently, the structure of the microscope will become very complicated and bulky. Further, there have been the problems that, to change the directions in which plural observers see through the microscope, the whole of the variable magnification optical systems must be moved and rotated, so that the structure becomes more complicated with difficult adjustment. Moreover, the problems have arisen that the use of a plurality of variable magnification optical systems makes it liable to produce an error of adjustment due to the difference in magnification between the images of the bilateral optical system to be observed and develop eyestrain attributable thereto.

Also, an optical system is available in which a pair of eyepieces is disposed through reflecting members behind a single objective lens for the stereoscopic view. In the optical system proposed, for example, by Japanese Patent Preliminary Publication No. Sho 61-61118 shown in FIG. 7, by changing the angles of mirrors 2a, 3a and 2b, 3b in pairs, the courses of rays of light are altered from the optical paths indicated by the broken lines to those by the chain lines and the internal inclination angles of the bilateral optical path are changed accordingly so that correct stereoscopic visibility is secured. This example, however, falls to show the combination with the variable magnification optical system.

SUMMARY OF THE INVENTION

It is, therefore, a primary object of the present invention to provide a stereomicroscope with a simple structure and easy adjustment.

Another object of the present invention is to provide a stereomicroscope in which plural people can make observations, the mountings of photographic and TV devices are possible, and directions in which plural observers see through the microscope can be changed with ease.

Still another object of the present invention is to provide a stereomicroscope which maintains constantly stereoscopic visibility in the change of magnification and does away with the need for the change of the distance between the ocular optical systems.

According to one aspect of the present invention, the stereomicroscope includes an objective lens, a variable magnification optical system disposed on the same axis as the objective lens, an optical path splitting optical system disposed on the exit side of the variable magnification optical system and splitting emergent light from the variable magnification optical system into plural optical paths, and an observation optical system having an eyepiece disposed on at least one of the plural optical paths, in which the eyepiece has a diameter larger than the interpupil distance of an observer.

According to another aspect of the present invention, the stereomicroscope includes an objective lens, a variable magnification optical system disposed on the same axis as the objective lens, an optical path splitting optical system disposed on the exit side of the variable magnification optical system and splitting emergent light from the variable magnification optical system into plural optical paths, and an observation optical system having a pair of eyepieces disposed in at least one of the plural optical paths.

According to still another aspect of the present invention, the stereomicroscope includes an objective lens, a variable magnification optical system disposed on the same axis as the objective lens, an optical path splitting optical system disposed on the exit side of the variable magnification optical system and splitting emergent light from the variable magnification optical system into plural, three or more, optical paths, and an observation optical system having eyepieces disposed in two of the plural optical paths.

In any of the cases mentioned above, the variable magnification optical system is single and the optical path is split for stereoscopic vision behind the variable magnification optical system, so that many people can make observations and the structure for enabling photographic and TV devices to be mounted is simple. Further, since any arrangement dispenses with the need for the movement of the variable magnification optical system even when the directions in which plural observers see through the microscope are changed, the structure is simplified and adjustment is facilitated. Moreover, the single variable magnification optical system makes it difficult to produce the difference in magnification between the images of the bilateral optical system to be observed and consequently, to develop eyestrain.

According to a further aspect of the present invention, the stereomicroscope has an objective optical system including a variable magnification section and a pair of ocular optical systems disposed at the exit pupil of the objective optical system and lying at the positions where individual optical axes deviate from that of the objective optical system so that the object can be stereoscopically viewed at a predetermined internal inclination angle, in which an optical path converting means making rays having the predetermined internal inclination angle incident on the ocular optical systems, irrespective of the magnification change, is provided between the variable magnification section and the ocular optical systems. Thus, this arrangement maintains constantly stereoscopic visibility and dispenses with the need for the change of the distance between the ocular optical systems.

These and other objects as well as the features and the advantages of the present invention will become apparent from the following detailed description of the preferred embodiments when taken in conjunction with the accompanying drawings.

BRIEF DESCRIPTION OF THE DRAWINGS

FIGS. 16 to 19 are views showing the optical systems of fifth to eighth embodiments, respectively;

FIGS. 20 and 21 are perspective views of a converting optical system for an observation optical system axis height of the eighth embodiment and a modification example thereof, respectively.

DETAILED DESCRIPTION OF THE PREFERRED EMBODIMENTS

Figure 1:
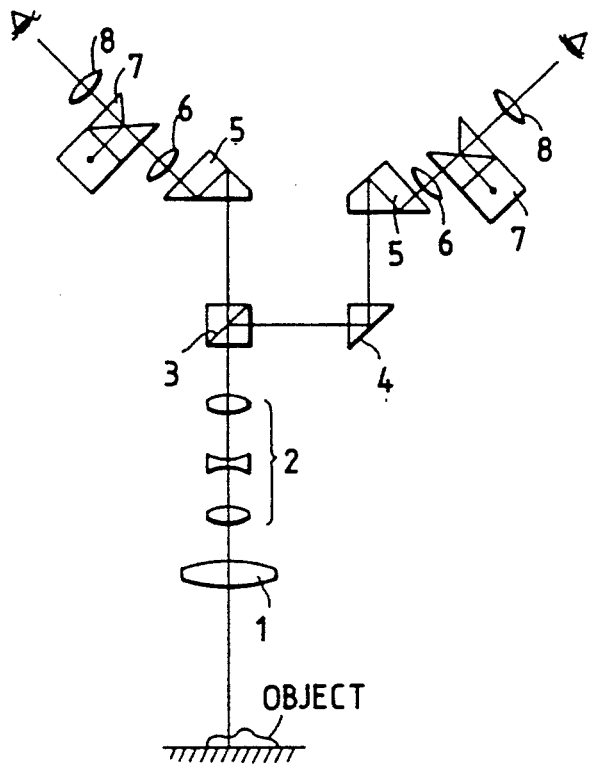
FIGS. 1 and 2 are a side view showing the entire optical system of an example of conventional stereomicroscopes and a perspective view of an essential part thereof, respectively.
Figure 2:
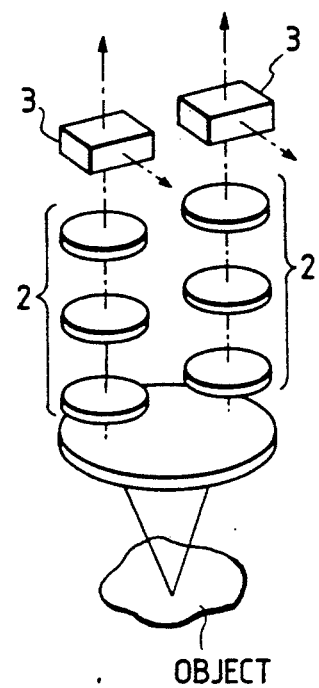
Figure 3:
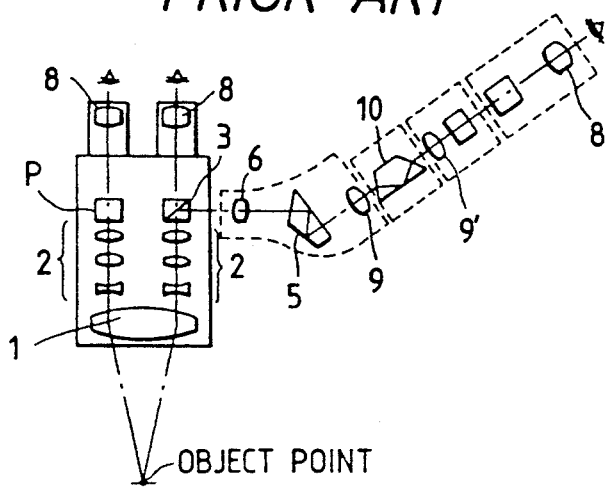
FIGS. 3 and 4 are a front view showing the entire optical system of another conventional example and a plan view of a pupil dividing section thereof, respectively.
Figure 4:
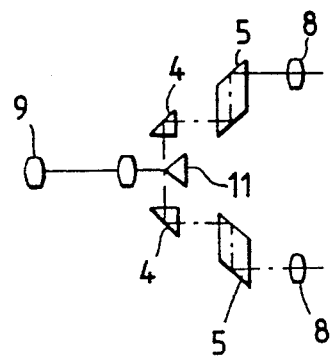
Figure 5:
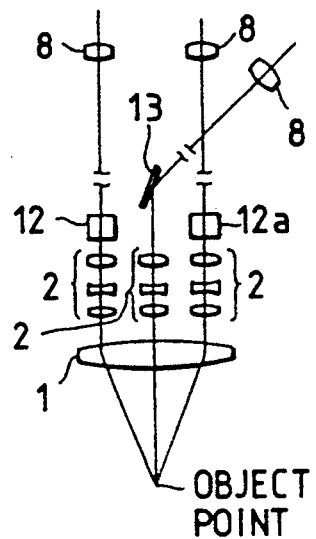
FIGS. 5 and 6 are a front view showing the entire optical system of still another conventional example and a plan view of an essential part thereof, respectively.
Figure 6:
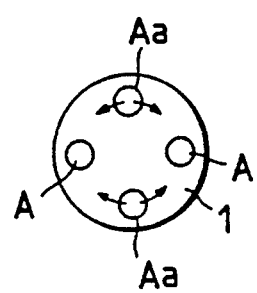
Figure 7:
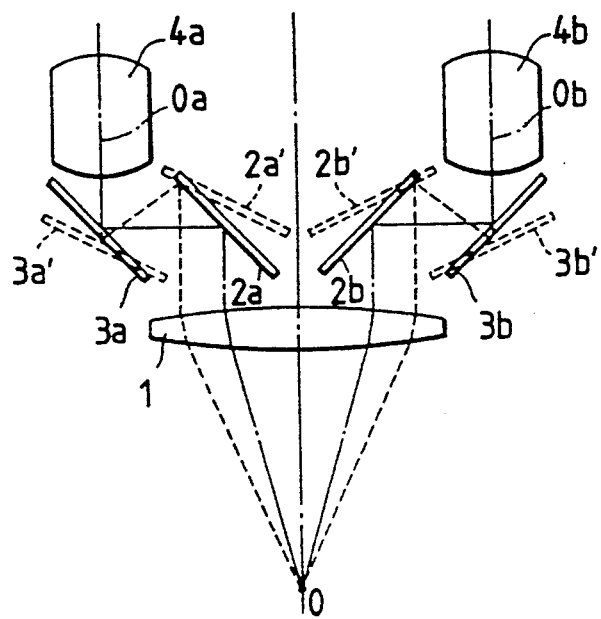
FIGS. 7 is a view showing the optical system of a further conventional example having an optical path converting means.

In accordance with the embodiments shown in the drawings, the present invention will be described in detail below.

Figure 8:
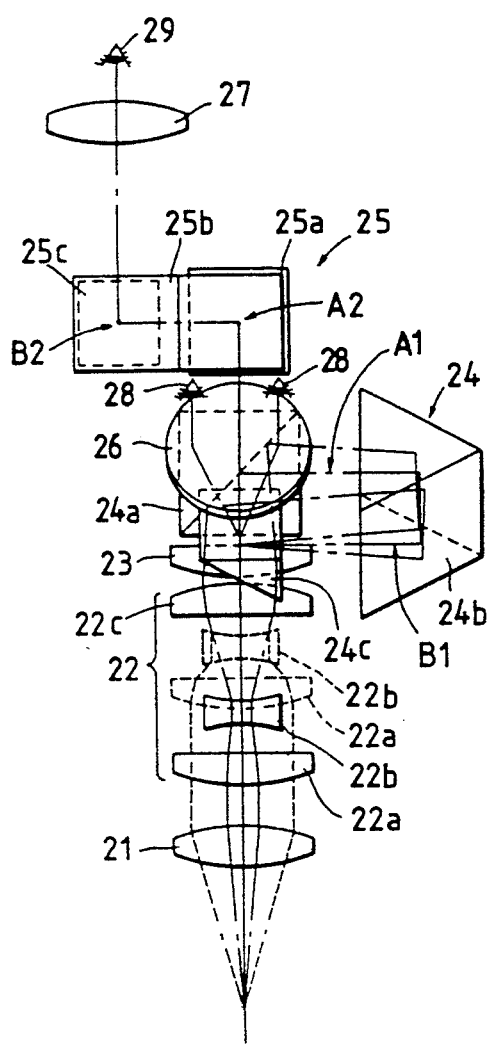
FIGS. 8 and 9 are front and right side views, respectively, of the optical system of a first embodiment of a stereomicroscope according to the present invention.
Figure 9:
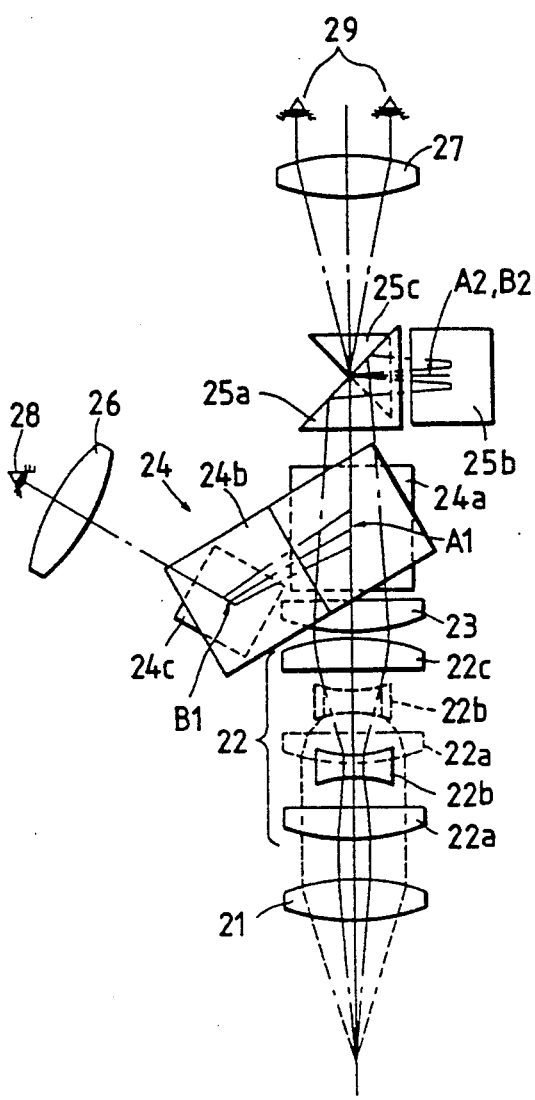

FIGS. 8 and 9 are front and right side views, respectively, of the optical system of a first embodiment of the stereomicroscope according to the present invention, in which the arrangement is such that two observers can make observations at the same time. This optical system is equipped with an interchangeable objective lens 21 collimating rays of light emanating from the surface of an object and an afocal variable magnification optical system 22 having an optical axis common with the objective lens 21 on the exit side of the objective lens 21. The afocal variable magnification optical system 22 is comprised of movable lens units 22a and 22b moving along the optical axis and a fixed lens unit 22c, and the movable lens units 22a and 22b are shifted from the positions indicated by solid lines to the positions by broken lines, thus causing magnification to be changed. On the exit side of the afocal variable magnification optical system 22, there is an imaging lens 23 forming, as an image, parallel beams of light emerging from the variable magnification optical system 22. A prism 24a is disposed on the exit side of the imaging lens 23 and splits the light beams into one optical path reflected therefrom and the other optical path transmitted thereby. Light transmitted through the prism 24a is introduced through an image erecting optical system (Porro prism) 25 for a first observer, composed of three prisms 25a, 25b and 25c for image erection, into an eyepiece 27 for the first observer, having an optical axis common with the imaging lens 23. Light reflected from the prism 24a, on the other hand, is twice reflected by a prism 24b and then reflected at a prism 24c to be introduced into an eyepiece 26 for a second observer. Here, since the optical system composed of the prisms 24a to 24c has the arrangement of reflecting surfaces identical with those of the Porro prism and carries out the image erection and the conversion of the optical path to an observing direction at once, it is to be hereinafter referred to as the Porro prism 24. In this arrangement, all the optical axes of the objective lens 21 to the eyepiece 26 or 27 are common with one another and the effective diameters of the eyepieces 26 and 27 are larger than the interpupil distances of observers, so that the eyes themselves of each observer serve as an optical system for setting the pupil for stereoscopic vision.

Additionally, the arrangement is made such that the Porro prism 24 and the eyepiece 26 can be freely rotated, integral with each other, around the optical axis of the imaging lens 23, as a boundary between the imaging lens 23 and the Porro prism 24 for the first observer. Similarly, the Porro prism 25 and the eyepiece 27 can be moved and rotated, integral with each other, in regard to the imaging lens 23 as a boundary between the Porro prism 24 for the first observer and the Porro prism 25 for the second observer. Consequently, the directions in which two observers make observations can be freely altered.

Since the first embodiment is constructed as in the foregoing and has the features that the variable magnification optical system 22 is single and the optical path is split for stereoscopic vision behind the variable magnification optical system 22, observations can be made by a number of people and the structure for mounting photographic and TV devices is simple. Further, since the directions in which plural observers see through the microscope can be changed without moving the variable magnification optical system 22, the structure is simplified and adjustment is facilitated. Moreover, the single variable magnification optical system 22 makes it difficult to produce the difference in magnification between the images of the bilateral optical system to be observed and therefore, to develop eyestrain. Also, observing optical paths for two observers are secured by splitting one optical path, so that they can observe images with the same magnification and stereoscopic visibility.

In the first embodiment, each of the Porro prisms 24 and 25 is comprised of three separate prism elements and as such the use of these prism elements makes it possible to vary an inclination angle. For the first observer, a description will now be given of the method of changing the inclination angle of the optical axis of the observation optical system. The optical axis of the objective optical system between the prisms 24a and 24b is represented by a first rotary axis A1 and that between the prisms 24b and 24c by a second rotary axis B1. When the prisms 24b and 24c are rotated about the rotary axes A1 and B1, respectively, the inclination angle of the optical axis of the observation optical system will vary. Here, if the ratio of the rotating angle of the first rotary axis A1 to the second rotary axis B1 is taken as 1:2, the image will not rotate. The same holds for the prism 25 for the second observer. Thus, the degree of freedom in the observing direction can be increased. Also, rotary axes A2 and B2 for the first observer are such as to be perpendicular to the plane of the figure in FIG. 8 and to overlap with each other in FIG. 9.

If, although the image to be observed become dark, the Porro prism 24 and the eyepiece 26 are inserted, in sets of n, between the prisms 24a and 25a and a light amount divisional ratio is taken as transmittance: reflectance = n+1:1, n+2 observation optical systems can be obtained. Thus, by the split of the optical path subsequent to the prism 24a, the number of observers can be increased.

Figure 10:
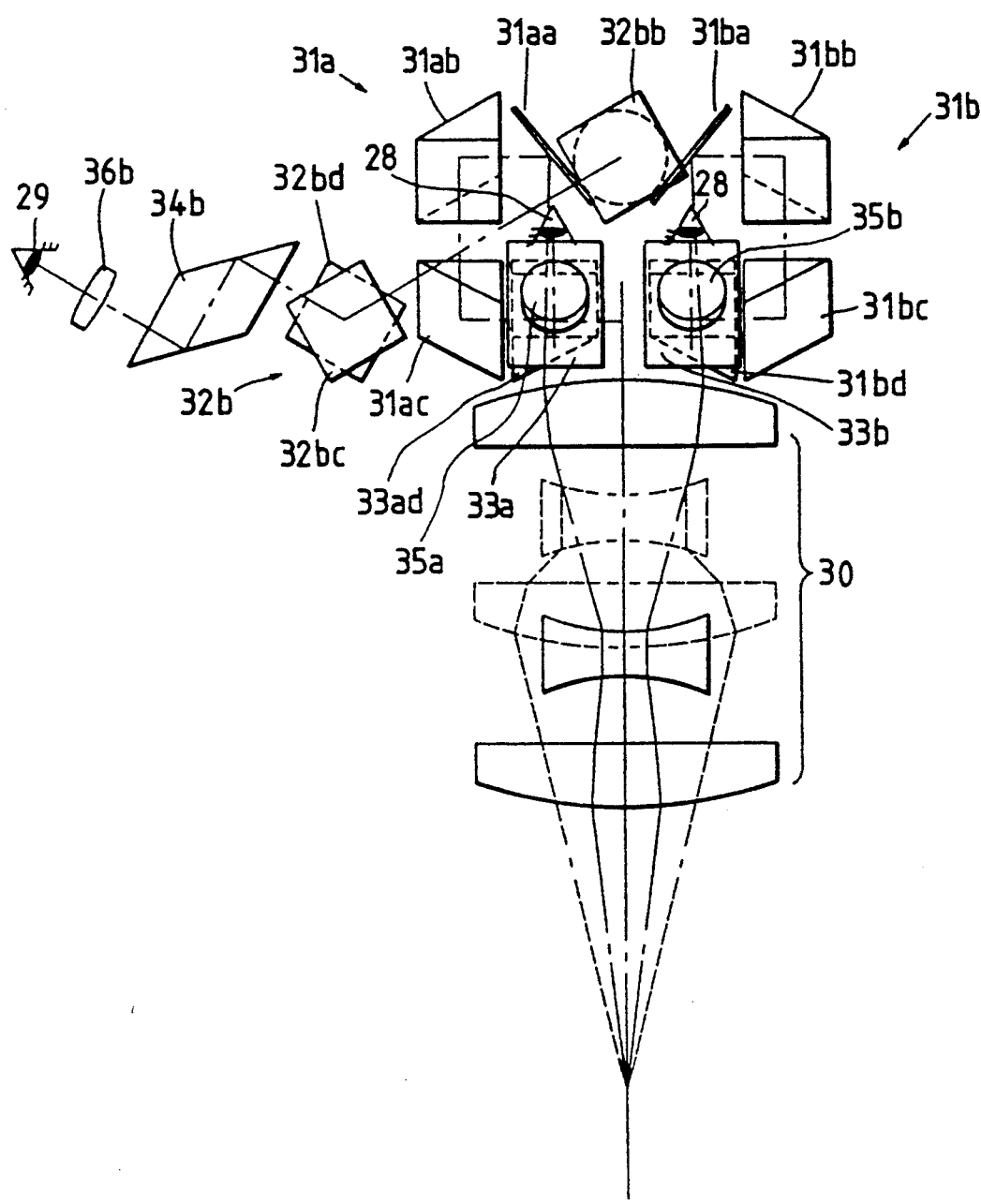
FIGS. 10 and 11 are front and plan views, respectively, of the optical system of a second embodiment.
Figure 11:
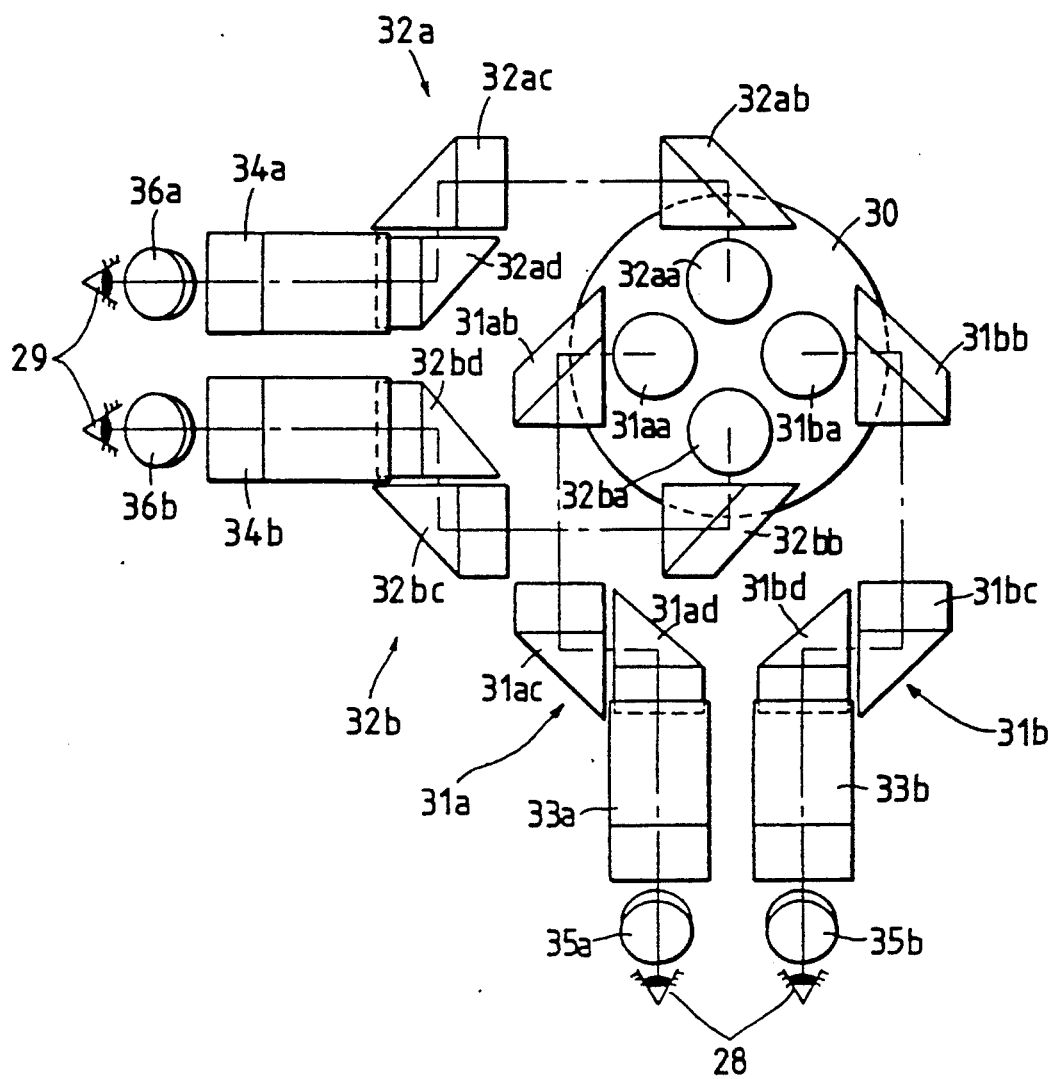

FIGS. 10 and 11 are front and plan views, respectively, of the optical system of a second embodiment, which comprises an objective optical system including an imaging optical system 30 capable of changing magnification and a pupil setting optical system including image erecting optical systems 31a, 31b, 32a, and 32b for setting four pupils, disposed at the position deviated from the optical axis of the objective optical system between the objective optical system and the imaging point thereof, prisms 33a, 33b, 34a, and 34b for adjusting the interpupil distance, and four eyepieces 35a, 35b, 36a, and 36b for two observers. Each of the image erecting optical systems 31a, 31b, 32a, and 32b is composed of a mirror and three prisms, which are denoted by further using subscripts a, b, c, and d to the corresponding reference numeral. The optical path for the first observer involves the image erecting optical system 31a and 31b, the prisms 33a and 33b for adjusting the interpupil distance, and the eyepieces 35a and 35b, while the optical path for the second observer involves the image erecting optical system 32a and 32b, the prisms 34a and 34b for adjusting the interpupil distance, and the eyepieces 36a and 36b.

For this arrangement, a description will now be given of one ray tracing. Part of a beam of light emerging from the objective optical system 30 is laterally reflected by a mirror 31ba disposed out of the optical axis, further reflected from prisms 31bb, 31bc, and 31bd, and incident on the interpupil distance adjusting prism 33b. The light, after being twice-reflected by the prism 33b, is introduced into the eyepiece 35b. Since individual reflecting surfaces of the mirror 31ba and the prisms 31bb, 31bc, and 31bd are arranged similar to those of the Porro prism, the image can be erected.

The second embodiment is constructed as mentioned above and a simple arrangement of the pupil setting optical system leads to an easy change of the observing direction and downsizing of the stereomicroscope. Further, by increasing the number of pupils in the pupil setting optical system (namely, by increasing the image erecting optical system, the interpupil distance adjusting optical system, and the eyepiece), the number of people who can make observations at once is increased without reducing the brightness of the image to be observed. Additionally, even when the increased optical paths are used for photographic and TV devices, rather than for observation, the amount of light is not reduced by the light division, so that a stop can be stopped down and the image of a large depth of field is brought about.

Figure 12:
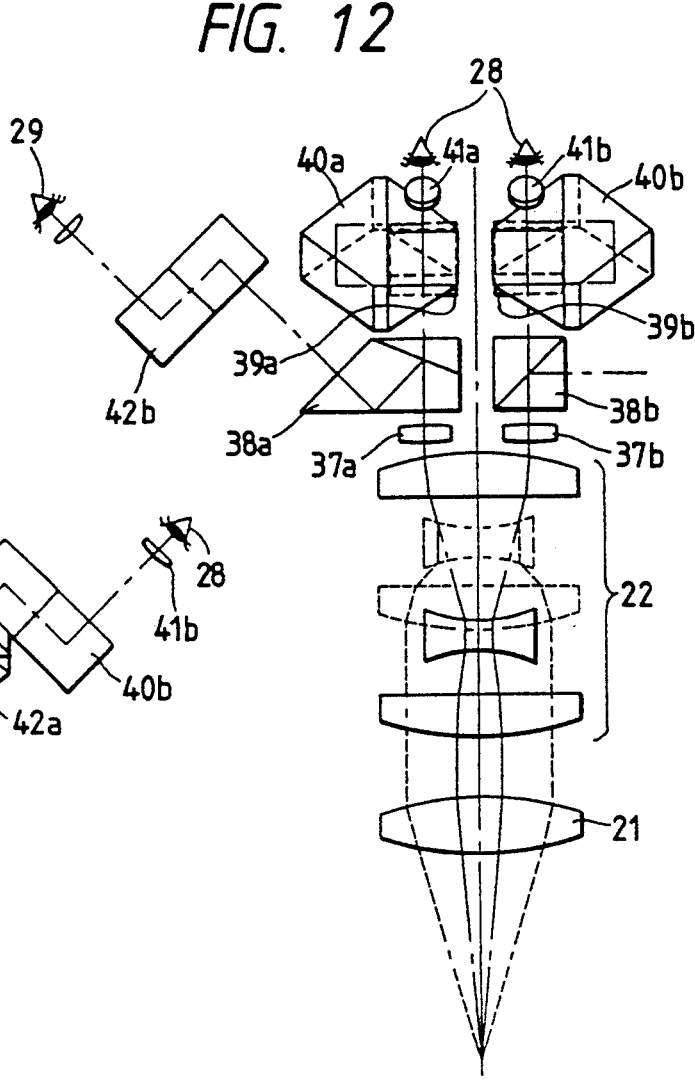
FIGS. 12 to 14 are front and right side views of a third embodiment and a view showing the relationship between the pupils of a variable magnification optical system and a pupil setting optical system, respectively.
Figure 13:
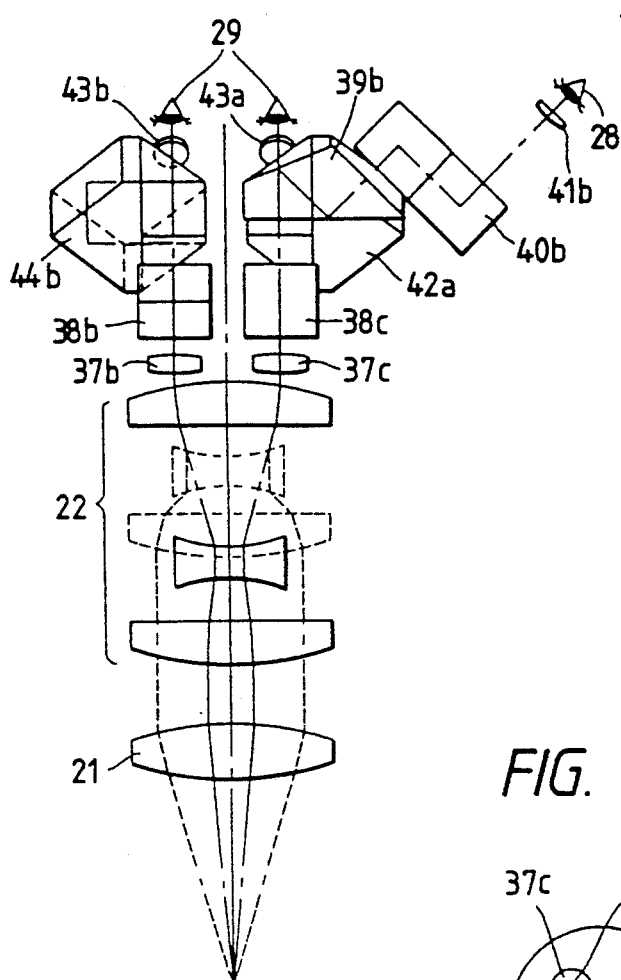
Figure 14:
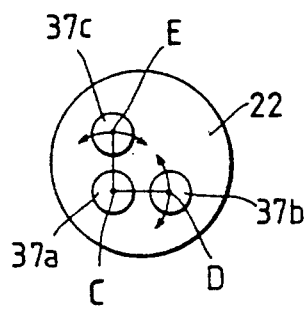

FIGS. 12 and 13 are front and right side views, respectively, of the optical system of a third embodiment, which comprises an objective optical system in which the objective lens 21 and the afocal variable magnification optical system 22 have the same optical axis, imaging lenses 37a, 37b, and 37c setting three optical axes on the object side, an optical path splitting element 38a dividing the optical path for the first and second observers, optical path splitting elements 38b and 38c dividing the optical paths for other observers and photographic and TV devices, inclination angle deflecting optical systems 39a and 39b for the first observer, and a pupil setting optical system including image erecting optical systems (Porro prisms) 40a and 40b for the first observer, eyepieces 41a and 41b for the first observer, image erecting optical systems (Porro prisms) 42a and 42b for the second observer, and eyepieces 43a and 43b for the second observer. The third embodiment is characterized in that, an observation optical path C is split for use common to two observers and either of other observation optical paths D and E or both of them are turned about the observation optical path C so that one or two observers can arbitrarily change the observing direction. FIG. 14 shows the relationship between the pupils of the variable magnification optical system 22 and the imaging lenses 37a, 37b, and 37c composing the pupil setting optical system. In order to eliminate the difference in brightness between the images of the bilateral observation optical system, observation optical paths D and E are provided with the optical path splitting elements 38b and 38c so that photographic and TV devices are mounted. Furthermore, the arrangement is such that each of the image erecting optical systems 40a, 40b, 42a, and 42b is rotated about the optical axis lying on the entrance side, thereby enabling the interpupil distance to be adjusted.

The objective optical system of the third embodiment has the same arrangement, from the objective lens 21 to the afocal variable magnification optical system 22, as that of the first embodiment. If, therefore, the optical systems subsequent to the variable magnification optical system 22 are incorporated in a common housing as a unit and can be separated from the objective lens 21 and the variable magnification optical system 22, the arrangements of the first and third embodiments can be replaced with each other, with the result that the observation optical systems can be more arbitrarily selected.

In the embodiments mentioned above, when the magnification is changed, the courses of rays incident on the eyepieces vary, for instance, in the first embodiment shown in FIGS. 8 and 9, from the optical paths indicated by the chain lines to those indicated by the broken lines in the arrangement of the objective lens 21 and the afocal variable magnification optical system 22. Hence, the stereoscopic visibility of the image being observed varies with the magnification change.

Next, a description will be given of the arrangement in which the stereoscopic visibility does not vary with the magnification change.

Figure 15:
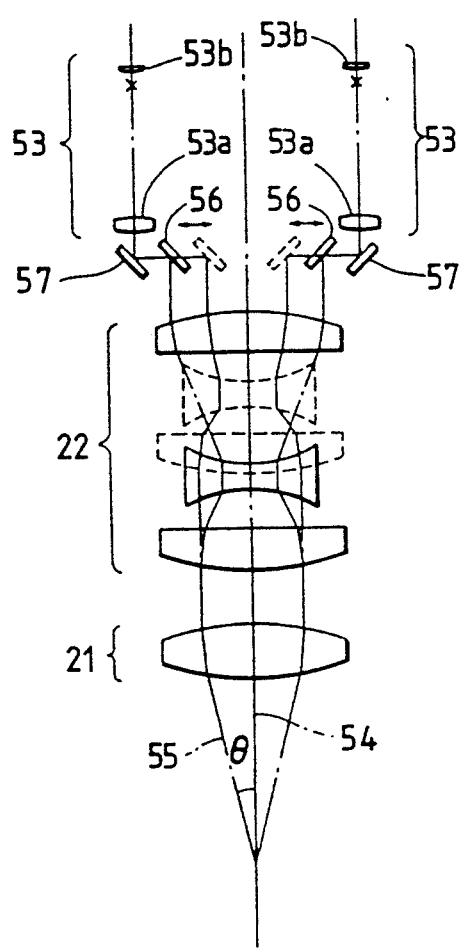
FIG. 15 is a view showing the optical system of a fourth embodiment.

A Galilean stereomicroscope using the afocal variable magnification optical system to change magnification is take as an example. The Galilean stereomicroscope, as depicted in FIG. 15, is constructed from the objective lens 21 collimating rays of light from the object, the afocal variable magnification optical system 22, and an ocular optical system 53 composed of imaging lenses 53a imaging the parallel rays and eyepieces 53b. The objective lens 21 and the afocal variable magnification optical system 22 constitute the objective optical system. The afocal variable magnification optical system 22, although it has usually a bilateral pair of variable magnification optical systems, is comprised of a single variable magnification optical system in the present invention, as illustrated in FIG. 15. The ocular optical system 53 is comprised of a bilateral pair of optical systems and can also be provided as a plural.

In the afocal variable magnification optical system 22, the height from an optical axis 54 of the afocal variable magnification optical system to an optical axis 55 of the observation optical system (which is hereinafter referred to as an observation optical system axis height) varies with the change of magnification. When $h_1$ is taken as the observation optical system axis height of the ray incident on the afocal variable magnification optical system and $h_2$ as the observation optical system axis height of the ray emerging from the afocal variable magnification optical system in the case where an afocal magnification is $\beta$, the relationship between them is expressed by $$\beta = h_1/h_2 \quad (1)$$

To make the stereoscopic visibility unchangeable, the emergent observation optical system axis height of the objective lens 21 (the incident observation optical system axis height of the afocal variable magnification optical system 22) must be made constant. Further, from the fact that the interpupil distance of the observer is constant, it is required that the observation optical system axis height of the ray incident on the ocular optical system 53 is also constant. In order to supply these requirements, therefore, the stereomicroscope of the present invention is provided with a means for adjusting constantly the emergent optical axis height in association with the change of magnification, namely, movable reflecting members 56 and reflecting members 57, between the afocal variable magnification optical system 22 and the ocular optical system 53.

The relationship among an internal inclination angle a, an angle b made by two optical axes emerging from the afocal variable magnification optical system, and the magnification $\beta$ of the afocal variable magnification optical system, is given by $$\beta = a/b \quad (2)$$

As mentioned above, it is required that when the variable magnification optical system is used in which the internal inclination angle and the angle made by two emergent optical axes vary with the change of magnification, a means for fixing an emergent angle and position in association with the change of magnification, that movable or rotatable reflecting members and deflecting members, are disposed between the variable magnification optical system and the ocular optical system in order that the stereoscopic visibility is constantly kept in the change of magnification, that is, the incident observation optical system axis height of the ocular optical system is made constant with the internal inclination angle unchanged.

Next, the embodiments of the optical systems of the stereomicroscope of the type will be explained. In each embodiment, the requisite components are, of course, arranged, although the ocular optical system is simplified and such image erecting optical systems as in the first to third embodiments are not shown in fact.

FIG. 15 shows a fourth embodiment of the present invention, in which the stereomicroscope comprising the objective lens 21, the afocal variable magnification optical system 22, and the ocular optical system 53 including the imaging lenses 53a and the eyepieces 53b, is equipped with the movable reflecting members 56, such as prisms and mirrors, and reflecting members 57 directing the reflecting light of the movable reflecting members 56 toward the ocular optical system 53. The movable reflecting members 56 are such as to be move in the direction perpendicular to the optical axis 54 of the variable magnification optical system in accordance with the equation:

$$h_1 \times \beta_1 = h_2 \times \beta_2 \quad (3)$$

where $\beta_1$ is the magnification in a first condition, $h_1$ is the observation optical system axis height at each reflecting surface of the movable reflecting members 56 in the first condition, $\beta_2$ is the magnification in a second condition, and $h_2$ is the observation optical system axis height in the second condition.

Thus, according to the fourth embodiment, an internal inclination angle $\theta$ of the objective lens 21 remains unchanged even when the magnification is varied, so that the stereoscopic visibility is consistently maintained. Additionally, even when the emergent observation optical system axis height of the afocal variable magnification optical system 22 varies, the incident observation optical system axis height of the ocular optical system 53 is constantly kept due to the behavior of the movable reflecting members 56 and the reflecting members 57. This dispenses with the need for the change of the space between the ocular optical systems 53.

Figure 16:
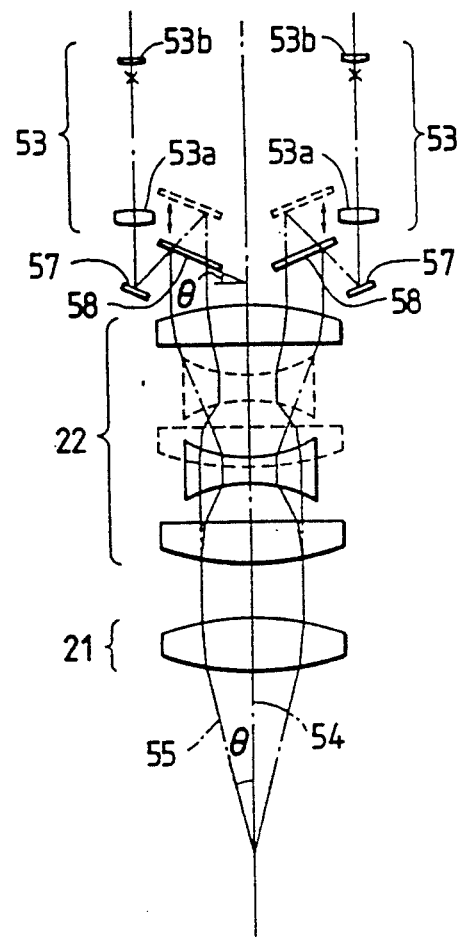

A fifth embodiment is constructed as shown in FIG. 16 and has the same arrangement as the fourth embodiment except for movable reflecting members 58. The movable reflecting members 58 is such as to be moved parallel with the optical axis of the variable magnification optical system, satisfying the equation:

$$h_1 \times \beta_1 = (h_1 + d \times \sin 2\theta) \times \beta_2 \qquad (4)$$

where $\beta_1$ is the magnification in a first condition, $h_1$ is the observation optical system axis height at each reflecting surface of the movable reflecting members 58 in the first condition, $\beta_2$ is the magnification in a second condition, d is the movement of each of the movable reflecting members 58 in the first and second conditions, and $\theta$ is the angle made by each reflecting surface of the movable reflecting members 58 with the plane perpendicular to the optical axis of the observation optical system.

The fifth embodiment is easy of mechanical manufacture because the direction of movement of the movable reflecting members 58 coincides with that of the constituent lenses of the variable magnification optical system 22.

Figure 17:
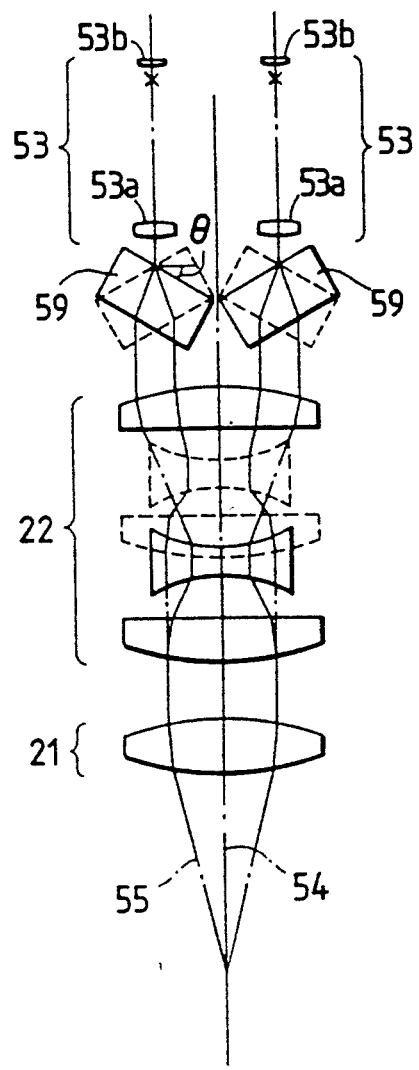

A sixth embodiment is constructed as depicted in FIG. 17 and has the same arrangement as the fourth embodiment except for the reflecting members. Rotatable plane-parallel plates 59, instead of the reflecting members of the fourth embodiment, are disposed so that each rotational angle and zoom magnification of the plates 59 are changed in accordance with the equation:

$$(1-\beta) \times h_1/t = \sin\theta - \cos\theta/(n - \sin^2\theta)^{\frac{1}{2}} \qquad (5)$$

where $\beta$ is the afocal magnification of the variable magnification section, $h_1$ is the observation optical system axis height of the ray incident on the plane-parallel plate 59, t is the thickness of the plane-parallel plate 59, n is the refractive index of the plate 59, and $\theta$ is the angle made by the plate 59 with the plane perpendicular to the optical axis. Also, when the afocal magnification is small and $1 >> \theta$, there results $$(1-\beta) \times h_1/t = \theta \times (1 - 1/n) \qquad (6)$$

The sixth embodiment can accommodate, with a simple arrangement, the case where the space between the optical axes on the exit side of the variable magnification optical system and the space between the optical axes of the ocular optical system vary with the change of magnification.

Figure 18:
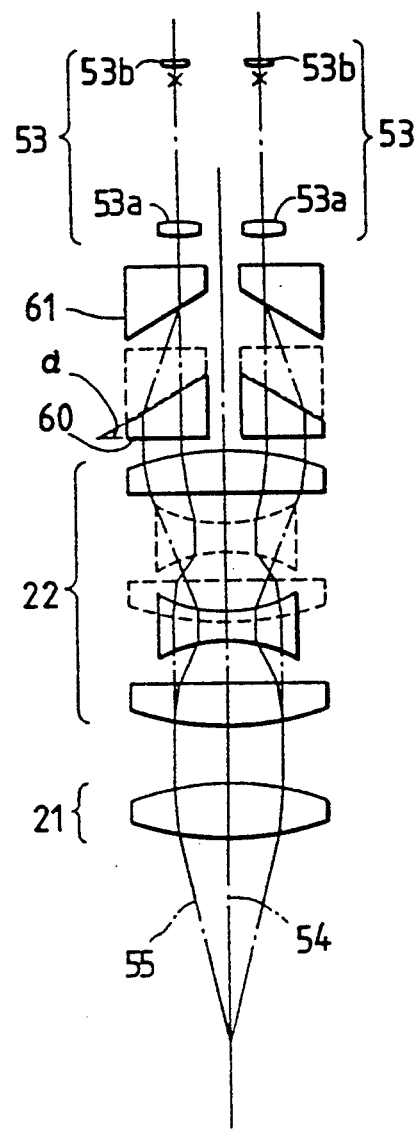

A seventh embodiment is constructed as shown in FIG. 18 and has the same arrangement as the fourth embodiment except for the reflecting members. Either of prisms 60 and 61 with the same vertical angle $\alpha$ or both of them are moved to change a space t between the two prisms 60 and 61, thereby enabling the observation optical system axis height to be changed. A movement d of the axis height in this case is given by $$d = t \times \cos\alpha \times \sin\alpha \times \{n \times \cos\alpha - (1 - n^2 \times \sin^2\alpha)^{\frac{1}{2}}\}/(1 - n^2 \times \sin^2\alpha)^{\frac{1}{2}} \qquad (7)$$

where n is the refractive index of each of the prisms 60 and 61.
The relationship brought about by the changeover from the first condition (the magnification $\beta_1$ and the observation optical system axis height $h_1$) to the second condition (the magnification $\beta_2$) is given by $$\beta_1 \times h_1 = \beta_2 \times (h_1 \times d) \qquad (8)$$

The seventh embodiment is easy of mechanical design because the direction of movement of the prisms coincides with that of the variable magnification optical system and the relationship between the displacement of the magnification and the movement of the prisms is consistent.

Figure 21:
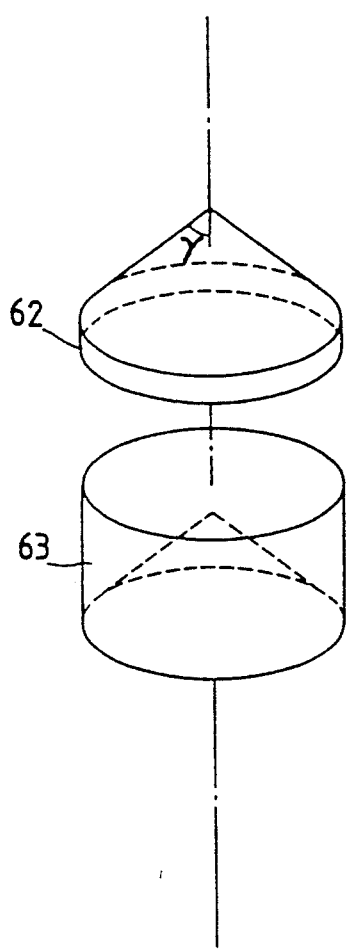

An eighth embodiment is constructed as shown in FIG. 19 and is provided with a converting mechanism for the observation optical system axis height between the objective lens 21 and the variable magnification optical system 22. This mechanism is such that, as shown in FIG. 20, prisms 62 and 63 made of glass materials of a refractive index n, having conical surfaces of the same vertical angle with a convex and a concave facing to each other, are moved to change the space t, and the observation optical system axis height is changed accordingly. When the vertical angle of the cone is represented by $\gamma$ and $\alpha = \pi/2 - \gamma$, the relationships between the magnification and the displacement are expressed by Equations (7) and (8) shown in the seventh embodiment. Further, as depicted in FIG. 21, the conical surfaces may be located on the outside. In this case, the displacement t of the space between the prisms 62 and 63 and the movement d of the observation optical system axis height are connected with each other, instead of Equation (7), by the equation:

$$d = \frac{t \times \{-\cos\alpha \times \sin\alpha + \sin\alpha(n^2 - \sin^2\alpha)^{\frac{1}{2}}\}}{n \times \{\sin^2\alpha + \cos\alpha(n^2 - \sin^2\alpha)^{\frac{1}{2}}\}} \qquad (9)$$

The eighth embodiment, unlike the fourth to seventh embodiments, does away with the need for interlocking of the ocular optical systems 53 and a converting optical system for the observation optical system axis height (the optical system composed of the prisms 62 and 63) when the ocular optical systems 53 are rotated around the optical axis of the variable magnification optical system. Hence, although the converting optical system for the observation optical system axis height is separated from the ocular optical systems 53, a complicated arrangement is not required when the eyepieces 53 are rotated.

Figure 22:
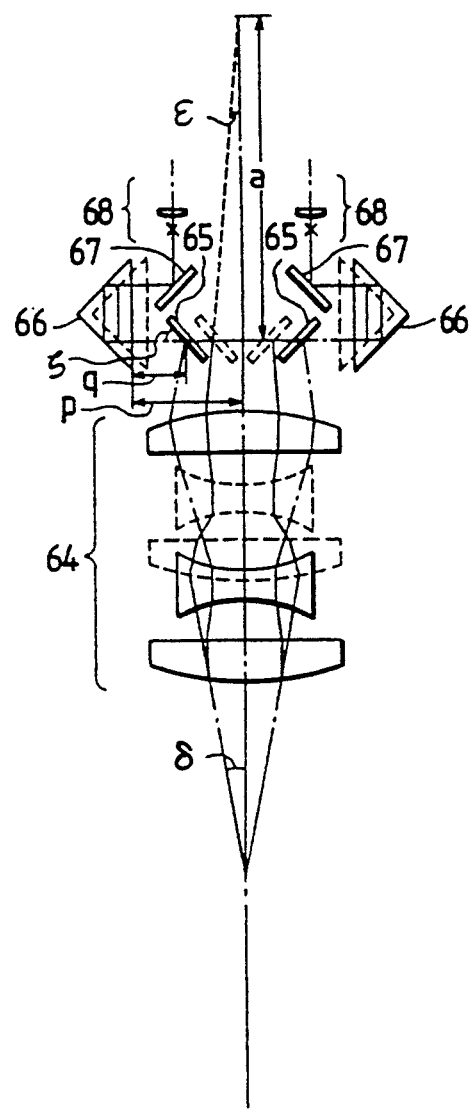
FIG. 22 is a view showing the optical system of a ninth embodiment.

A ninth embodiment, although the fourth to eighth embodiments each have the afocal variable magnification optical system 22, is the example of the stereomicroscope in which as shown in FIG. 22, a variable magnification optical system 64 is not the afocal optical system. In such an instance, if an internal inclination angle δ is constant, an angle ε made by the optical axis emerging from the variable magnification optical system with the optical axis of the observation optical system varies according to the magnification change. Furthermore, since the optical axes of the observation optical system converge at an image surface, both the angle and the corresponding height of the optical axis change except for the image surface. It follows from this that such a correcting mechanism for the observation optical system axis height corrects the angle and the height. Thus, two places must be moved in association with the variable magnification optical system 64. Moreover, since the variable magnification optical system is not afocal, the distance from the exit surface of the variable magnification optical system 64 to ocular optical systems 68 are changed and perfocality is also varied.

The ninth embodiment is therefore constructed so that the rotation and the movements in the direction perpendicular to the optical axis of movable reflecting members 65 keep the emergent optical axis constant and the movements of movable prisms 66 each twice-reflecting the optical axis therein maintain the perfocality. The light, after leaving the prisms 66, is directed toward the ocular optical systems 68. Each of the movable prisms 66 may well be substituted by two mirrors.

When the height from the optical axis of the variable magnification optical system 64 to each movable reflecting member 65 is denoted by h, the angle made with the optical axis of the movable reflecting member 65 by ζ, and the height from the optical axis of the variable magnification optical system 64 to the entrance surface of the prism 66 by m, the following equations are obtained:

$$h \times a \times \beta \times \sin \delta / (\beta^2 - \sin^2\delta)^{\frac{1}{2}} \quad (10)$$

$$\zeta = \pi/4 - \sin^{-1}(\sin \delta / \beta) \quad (11)$$

$$m = p + q/2 - a \times \beta \times \sin \delta / 2 / (\beta^2 - \sin^2\delta)^{\frac{1}{2}} \quad (12)$$

where a is the distance from the image surface to the movable reflecting member 65 in the direction of the optical axis of the variable magnification optical system, p is the distance from the optical axis of the variable magnification optical system 64 to the entrance surface of the movable prism 66, and q is the distance from the reflecting point of the optical axis of the movable reflecting member 65 at the minimum magnification of the variable magnification optical system to the entrance surface of the movable prism 66.

The ninth embodiment, although complicated in correction, can be downsized.

What is claimed is:

1. A stereomicroscope comprising:
   an objective lens having a single optical axis;
   a variable magnification optical system having an optical axis common with said single optical axis; and
   an eyepiece disposed on an exit side of said variable magnification optical system,
   wherein a pair of beams of light emanating from an object at a predetermined stereo angle passes through portions deviating from said optical axis of each of said objective lens and said variable magnification optical system, and is incident on said eyepiece, maintaining a predetermined distance between said pair of beams, and
   optical path correcting means disposed between said object and said eyepiece, for moving in association with a change of magnification of said variable magnification optical system so that so that when said pair of beams is incident on said eyepiece, a distance between said pair of beams remains unchanged irrespective of the change of magnification.

2. The stereomicroscope according to claim 1, wherein said optical path correcting means includes reflecting members that are slidably disposed.

3. The stereomicroscope according to claim 1, wherein said optical path correcting means includes refracting members that are rotatably disposed.

4. The stereomicroscope according to claim 1, wherein said optical path correcting means includes refracting members movably disposed along an optical axis of said stereomicroscope.

5. The stereomicroscope according to claim 4, wherein said refracting members include conical refracting surfaces.

6. A stereomicroscope comprising;
   an objective lens having a single optical axis;
   a variable magnification optical system having an optical axis common with said single optical axis;
   an optical system for receiving light emergent from said variable magnification optical system,
   wherein a pair of beams of light emanating from an object at a predetermined stereo angle passes through portions deviating from said optical axis of each of said objective lens and said variable magnification optical system, and is incident on said optical system, maintaining a predetermined distance between said pair of beams, and
   optical path correcting means disposed between said object and said optical system, for moving in association with a change of magnification of said variable magnification optical system so that when said pair of beams is incident on said optical system, a distance between said pair of beams remains unchanged irrespective of the change of magnification.

7. A stereomicroscope comprising:
   an objective lens having a single optical axis;
   a variable magnification optical system having an optical axis common with said single optical axis;
   optical path correcting means; and
   a plurality of pupils set on an exit side of said variable magnification optical system;
   wherein a pair of beams of light emanating from an object at a predetermined stereo angle passes through portions deviating from said optical axis of each of said objective lens and said variable magnification optical system, and is incident on said plurality of pupils, maintaining a predetermined distance between said pair of beams, and
   wherein said optical path correcting means is disposed between said object and said plurality of pupils, and is movable in association with a change of magnification of said variable magnification optical system so that when said pair of beams is incident on said plurality of pupils, a distance between said pair of beams remains unchanged irrespective of the change of magnification.

* * * * *